United States Patent
D'Amico et al.

[19]

[11] Patent Number: 5,594,950
[45] Date of Patent: Jan. 14, 1997

[54] RADIO COMMUNICATION SYSTEM

[75] Inventors: Charles R. D'Amico, Cambridge, Mass.; David Blumberg, Jr., Manchester, N.H.

[73] Assignee: Advanced TechCom, Inc., Lawrence, Mass.

[21] Appl. No.: 344,085

[22] Filed: Nov. 23, 1994

[51] Int. Cl.$^6$ ............................................. H04B 17/00
[52] U.S. Cl. ........................... 455/67.1; 455/86; 455/115; 455/255
[58] Field of Search .................... 455/67.1, 67.2, 455/67.3, 67.4, 67.5, 67.7, 77, 82, 83, 86, 226.1, 226.4, 230, 255, 115

[56] References Cited

U.S. PATENT DOCUMENTS 4,257,123  3/1981  Birt et al. ............................ 455/67.1
4,658,206  4/1987  Yamanaka ........................... 455/67.1
5,369,785  11/1994  Korhonen et al. .................... 455/67.1

*Primary Examiner*—Andrew Faile
*Assistant Examiner*—Doris To
*Attorney, Agent, or Firm*—Fish & Richardson, P.C.

[57] ABSTRACT

A radio communication system having, at a local station: a transmitter adapted to transmit signals to a remote station with a predetermined carrier frequency; and, a receiver tuned to a carrier frequency of signals transmitted to the local station from the remote station, the carrier frequency of the signals transmitted to the local station from the remote station being different from the carrier frequency transmitted by the local station to the remote station during a normal mode of operation and tuned to the carrier frequency of the signals transmitted by the local station during a test mode of operation. With such an arrangement, the carrier frequency of the transmitter at the local station can be tested by a receiver at the local station without requiring the use a the remote station and without requiring additional equipment.

1 Claim, 1 Drawing Sheet

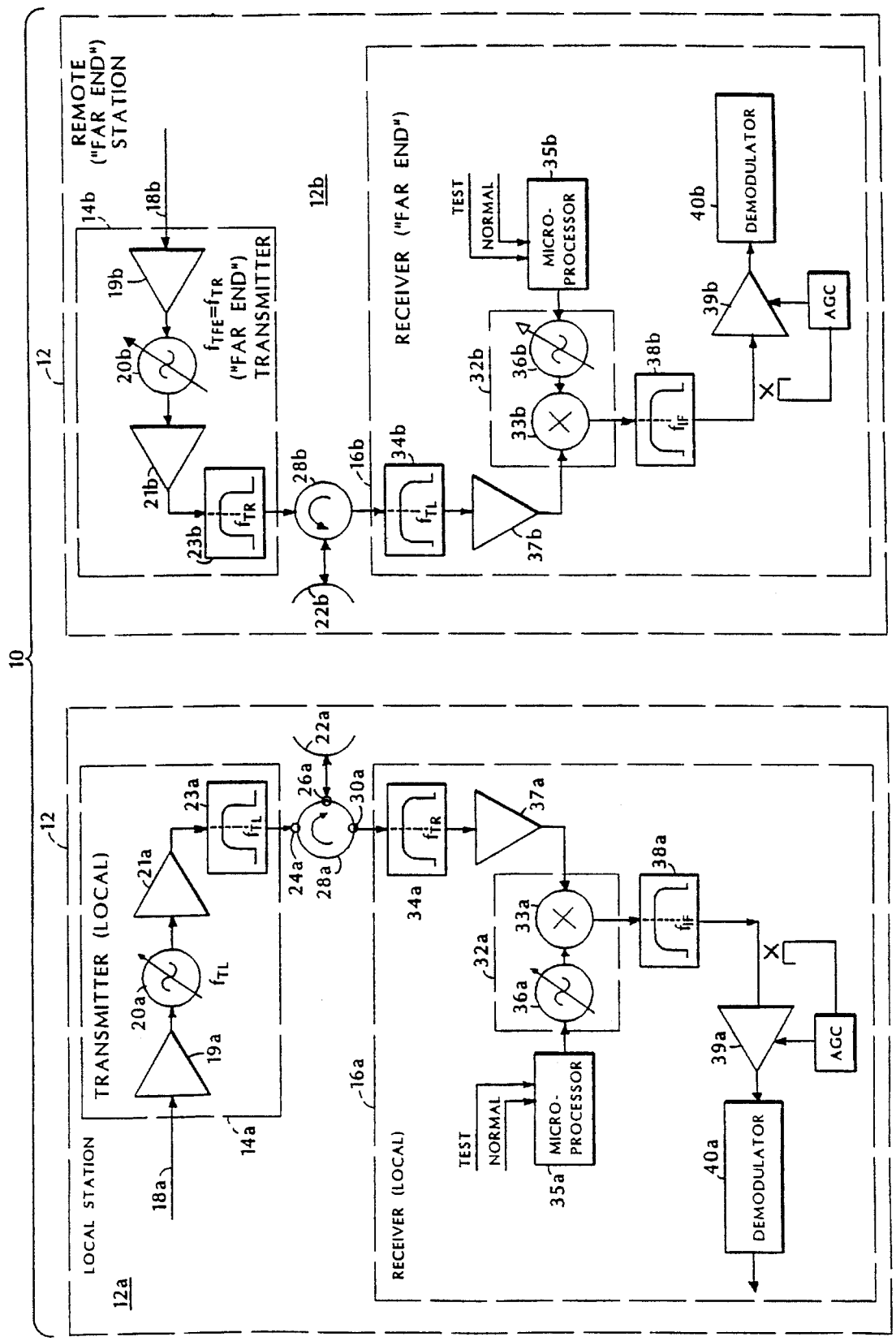

RADIO COMMUNICATION SYSTEM

BACKGROUND OF THE INVENTION

This invention relates generally to radio communication systems and more particularly to apparatus and methods used to test such systems.

As is known in the art, radio communication systems are being used extensively today. Such systems enable communications among fixed and mobile telecommunication subscribers. Information is sometimes transmitted through a network of wireless radio communication stations. Pairs of such stations are in bi-directional communication with each other. Thus, each station typically includes a transmitter, adapted to transmit information to another station, and a receiver, for receiving information from the other station. In order to isolate the signal transmitted by a station from the receiver at such station, the transmitter at the station transmits at a carrier frequency, $f_{TL}$, which differs in frequency by a fixed offset frequency, $f_{os}$, from the carrier frequency, $f_{TR}$, transmitted to such station by a remote, or "far end" station. Therefore, the receiver at the local station is tuned to a different frequency, $f_R = f_{TR}$ (i.e., to the carrier frequency transmitted by the "far end" station) from the carrier frequency, $f_{TL} = f_R - f_{os}$, transmitted at the local station.

As is also known, the local oscillators used in the transmitter and receiver at a station are adapted to have the frequency produced by them (i.e., the carrier frequency, $f_T$, produced by the transmitter and the local oscillator used to tune the receiver to the carrier frequency, $f_R = f_{TR}$ of the "far end" station) selected with in a range of frequencies, typically in increments of 10's of KHz over several 1 Ghz. The frequency control data used to select the carrier frequencies $f_T$, $f_R$ is typically provided by a microprocessor at the local station. Once selected, the carrier frequencies $f_T$, $f_R$ usually remain fixed during normal operation of the system. Such microprocessor generated frequency control data is used to fine tune the receiver so that signal received by the local station from the "far end" station are heterodyned to the predetermined intermediate frequency, $f_{IF} = f_{TL} - f_R$, of the receiver.

As is also known, it is sometimes necessary to test the operation of a local station's transmitter and receiver. One such test is used to verify the local station's transmitter's carrier frequency. One technique used to perform such test is to transmit a test signal from the local station to the "far end" station and have the "far end" station retransmit it back to the receiver of the local station. Such test is sometimes referred to as a "far end loop-back" test. While such test may provide some information about the operation of the two stations, it does not allow one to isolate the source of any fault; i.e., if there is a detected fault, one is not able to isolate it as a fault in the local station's transmitter or a fault in the operation of the "far end" station doing the re-transmission. Another test suggested is to provide a two input port-single output port switch. During normal operation, one of the pair of input ports would be coupled to the receiver output port of the station's transmit/receive (T/R) switch. During a test mode, the other one of the pair of input port would be serially coupled to a frequency converter having a local oscillator producing the fixed offset frequency, $f_{os}$. The signal at the output of the third port is thereby shifted in frequency to the station's transmitter carrier frequency $f_{TL}$. In this way, the local station's receiver would be tuned to the frequency of the local station's transmitter. The signal produced at the output of the test mode tuned receiver could then be used to detect faults in the local station transmitter. While such technique eliminates faults which may be at the far end site, it requires additional equipment, i.e., a switch and frequency converter.

SUMMARY OF THE INVENTION

With this background of the invention in mind, it is therefore, an object of this invention to provide an improved radio communication system.

It is another object of the invention to provide an improved method of testing a radio system used in a station of a radio communication system.

It is still another object of the invention to provide an improved, less expensive method of testing a radio system used in a station of a radio communication system.

These and other objects of the invention are attained generally by operating, during a normal operating mode, a transmitter at a local station of a radio communication system with a predetermined carrier frequency and a receiver at the local station tuned to a carrier frequency of signals transmitted to the local station from the remote station, the carrier frequency of the signals transmitted to the local station from the remote station being different from the carrier frequency of the signals transmitted by the local station to the remote station. During a test mode, the receiver is tuned to the carrier frequency of the signals transmitted by the local station.

In accordance with another feature of the invention, a radio communication system is provided having, at a local station: a transmitter adapted to transmit signals to a remote station with a predetermined carrier frequency; and, a receiver tuned to a carrier frequency of signals transmitted to the local station from the remote station, the carrier frequency of the signals transmitted to the local station from the remote station being different from the carrier frequency transmitted by the local station to the remote station during a normal mode of operation and tuned to the carrier frequency of the signals transmitted by the local station during a test mode of operation.

With such an arrangement, the carrier frequency of the transmitter at the local station can be tested by a receiver at the local station without requiring the use a the remote station and without requiring additional equipment.

In accordance with another feature of the invention, a radio communication system is provided, such system including a local radio station having a transmitter and a receiver. The transmitter at the local station is adapted to transmit signals to a remote station at a predetermined carrier frequency, $f_{TL}$. The receiver at the local station is tuned to receive signals from the remote station, such received signals having a different predetermined carrier frequency, $f_{TR}$. The receiver at the local station is coupled to an antenna of such local station through a band pass filter. The filter has a predetermined pass band selected to pass, substantially unattenuated, "in-band" signals received from the remote station, such "in-band" signals having frequencies within the band pass of the filter, and pass, substantially attenuated, "out-of-band" signals from the local station transmitter, such "out-of-band" signals having frequencies outside of the band pass of filter. A frequency converter is provided at the local station having a local oscillator adapted to produce, during a normal mode of operation, a local oscillator frequency, $f_{LO}$ equal to the difference between $f_{TR}$ and a predetermined intermediate frequency, $f_{IF}$, is provided to translate the frequencies of signals passed substantially unattenuated by the band pass filter to a predetermined band of intermediate frequencies. During a test mode of operation, the frequency of the local oscillator signal is changed to a frequency, $f_{LOTEST}$, either above or below $f_{TL}$. The frequency $f_{LOTEST}$ is equal to the difference between $f_{TL}$ and $f_{IF}$, to translate the frequencies of the substantially attenuated, "out-of-band" signals from the local station transmitter to the predetermined band of intermediate frequencies.

BRIEF DESCRIPTION OF THE DRAWING

Reference is now made to the single FIGURE showing a block diagram of a radio communication system according to the invention.

DESCRIPTION OF THE PROFFERED EMBODIMENTS

Referring now to the FIGURE, a radio communication system 10 is shown. Such system 10 enables communications among fixed and mobile telecommunication subscribers, not shown. Information is transmitted through a network of wireless radio communication stations 12; an exemplary pair of such stations 12a, 12b which are in bi-directional communication with each other being shown. Each station 12a, 12b includes a transmitter 14a, 14b, respectively, adapted to transmit information from such station to the other station, and a receiver 16a, 16b, respectively, for receiving information transmitted to such station from the other station. Because each of the stations 12a, 12b includes substantially the same elements, like elements will be designated with an "a" suffix in station 12a and with a "b" suffix in station 12b. Further, here station 12a is considered as the "local" station and station 12b is considered the remote, or "far end" station. Here, such system 10 is a frequency modulation (FM) system and intelligence fed to line 18a at the local station 12a is used to modulate the carrier frequency, $f_{TL}$, of the local oscillator 20a used in the transmitter of the local station 12a. In like manner, intelligence fed to line 18b at the remote station 12b is fed through amplifier 19b to modulate the carrier frequency, $f_{TR}$, of the local oscillator 20b used in the transmitter 14b of the remote station 12b. For reasons to be discussed in detail hereinafter, the carrier frequency, $f_{TL}$, of the local station 12a differs from the carrier frequency, $f_{TR}$, of the remote station 12b by a fixed offset frequency, $f_{os}$.

Considering the operation of station 12a, and recognizing that station 12b operates in like manner, the FM modulated signal produced by oscillator 20a is fed, via amplifier 21a, to a band pass filter 23a. Band pass filter 23a has a center frequency at the carrier frequency, $f_{TL}$. The amplified signal is fed to the local station's antenna 22a through first and second ports 24a, 26a, respectively, of a non-reciprocal, three port device such as a circulator 28a, for example. The receiver 16a of the local station 12a is coupled to the local station's antenna 22a through the third port 30a of the circulator 28a, as shown. The output of the third port 30a is fed to a band pass filter 34a tuned to the carrier frequency of the transmitter 14b at the remote or "far end" station 12b, i.e., $f_{TR}$. More particularly, the filter 34a has a predetermined pass band selected to pass, substantially unattenuated, "in-band" signals received from the remote station 12b having frequencies within the band pass of the filter 34a, and pass, substantially attenuated, "out-of-band" signals having frequencies outside of the band pass of filter 34a. Thus, filter 34a has a center frequency of $f_{TR}$. Here, filter 34a is a conventional filter having a bandwidth of, here, between 1 and 100 MHz.

That is, as noted above, the remote, or "far end" station's transmitter 14b has a carrier frequency, $f_{TR}$, which is different from the local station's carrier frequency $f_{TL}$ by the fixed offset frequency $f_{os}$, typically 1 GHz. Thus the receiver 16a at the local station 12a, being tuned to the carrier frequency, $f_{TR}$, of the remote station 12b, is tuned to a frequency different from the carrier frequency, $f_{TL}$, of the transmitter 14a at the local station 12a. This is done in order to isolate the local station's transmitter 14a from its receiver 16a. Thus, the carrier frequency of transmitter 14b, $f_{TR}=f_{TL}+/-f_{os}$.

The receiver 16a at the local station 12a down-converts the frequency of the signal received passed by the band pass filter 34a to a predetermined intermediate frequency, $f_{IF}$. More particularly, as noted above, the filter 34a has a predetermined pass band selected to pass, substantially unattenuated, "in-band" signals received from the remote station 12b having frequencies within the band pass of the filter 34a, and pass, substantially attenuated, "out-of-band" signals having frequencies outside of the band pass of filter 34a. These "out-of-band" signals include signals produced by the transmitter 16a at the local station 12a. During the normal mode of operation, an oscillator 36a of a frequency converter 32a is controlled by microprocessor, or other electronic control circuit, 35a to produce a local oscillator frequency, $f_{LO}$ equal to the difference between $f_{TR}$ and $f_{IF}$. The signal produced by the local oscillator 36a along with the signals passed by band pass filter 34a and amplifier 37a, are fed to a mixer 33a, as shown. Thus, the frequency of the signals passed by band pass filter 34a are translated in frequency by $f_{LO}$. The frequencies components of the signal transmitted by station 12b which pass substantially unattenuated through band pass filter 34a, i.e., the "in-band" signals, are translated to a predetermined band of intermediate frequencies centered about the predetermined frequency, $f_{IF}$. The predetermined band of intermediate frequencies is within the pass band of band pass filter 38a. Band pass filter 38a has a center frequency of $f_{IF}$ and a bandwidth of, here, 100 MHz. During a test mode of operation, the frequency of the local oscillator 36a is changed by the microprocessor 35a to a frequency, $f_{LOTEST}$ equal to the difference between $f_{TL}$ and $f_{IF}$, to translate the frequencies of the signals passing through the band pass filter 34a by $f_{LOTEST}$. Thus, a portion of the signals transmitted by the transmitted 14a at the local station 12a which pass from antenna 22a to port 30a of circulator 28a, while substantially attenuated by filter 34a as "out-of-band" signals, are translated in frequency to the pass band of filter 38a; and, the "in-band" signals from transmitter 16b, while passing substantially unattenuated through band pass filter 34a, are now translated in frequency to be outside of the pass band of band pass filter 38a.

The down converted signal passed through a band pass filter 38a during either the test mode or the normal operating mode are fed through em automatic gain controlled (AGC'd) amplifier, or limiter 39a for demodulation in demodulator 40a to extract the intelligence carried to the receiver 14a by: the transmitter 14b of the remote station 12b, during the normal mode of operation; or, the transmitter 14a at the local station 12a, during the test mode.

Thus, with the arrangement described above, the carrier frequency $f_{TL}$ of the transmitter 14a at the local station 12a can be tested by the receiver 16a at the local station 12a without requiring the use a the remote station 12b and without requiring additional equipment.

Referring now to the remote station 12b, such station 12b includes: an oscillator 20b, here providing a carrier frequency $f_{TR}$, for intelligence on line 18b; an amplifier 21b. a band pass filter 23b, here having a center frequency, $f_{TR}$; a circulator 28b; an antenna 22b; a band pass filter 34b, here having a center frequency, $f_{TL}$; an amplifier 37b; a frequency converted 32b having mixer 33b and local oscillator 36b; a band pass filter 38b having a center frequency, $f_{IF}$; an AGC'd amplifier, or limiter 39b; a demodulator 40b; and a microprocessor, or other electronic control circuit 35b. Here, microprocessor 35b produces a control signal for oscillator 36b which causes such oscillator 36b to produce a local oscillator signal having: a frequency equal to the difference between $f_{TL}$ and $f_{IF}$ during a normal mode of operation of station 12b; and, a frequency equal to the difference between $f_{TR}$ and $f_{IF}$ during a test mode of operation of station 12b.

Having described a preferred embodiment of the invention, other embodiments will now become readily apparent to one of ordinary skill in the art, It is felt, therefore, that the invention should not be restricted to the disclosed embodiment, but rather should be limited only by the spirit and scope of the appended claims.

What is claimed is:

1. A radio communication system, comprising:
    a local radio station having:
        a transmitter, adapted to transmit signals to a remote station at a predetermined carrier frequency, $f_{TL}$; and,
        a receiver tuned, during a normal mode of operation, to receive signals from the remote station, such received signals having a different predetermined carrier frequency, $f_{TR}$;
    an antenna coupled to the transmitter and the receiver; such receiver having:
        a band pass filter coupled to the antenna, the filter having a predetermined pass band selected to pass, substantially unattenuated, "in-band" signals received from the remote station, such "in-band" signals having frequencies within the band pass of the filter, and pass, substantially attenuated, "out-of-band" signals from the station transmitter, such "out-of-band" signals having frequencies outside of the band pass of filter;
        a frequency converter, having a local oscillator adapted to produce, during a normal mode of operation, a local oscillator frequency, $f_{LO}$ equal to the difference between $f_{TR}$ and a predetermined intermediate frequency, $f_{IF}$, to translate the frequencies of signals passed substantially unattenuated by the band pass filter to a predetermined band of intermediate frequencies and, to produce, during a test mode of operation, a frequency, $f_{LOTEST}$ equal to the difference between $f_{TL}$ and $f_{IF}$, to translate the frequencies of the substantially attenuated, "out-of-band" signals from the local station transmitter to the predetermined band of intermediate frequencies.

* * * * *